(12) United States Patent
Ruthven

(10) Patent No.: US 11,945,399 B1
(45) Date of Patent: Apr. 2, 2024

(54) VEHICLE IGNITION INTERLOCK

(71) Applicant: Larry V. Ruthven, Livingston, TX (US)

(72) Inventor: Larry V. Ruthven, Livingston, TX (US)

(*) Notice: Subject to any disclaimer, the term of this patent is extended or adjusted under 35 U.S.C. 154(b) by 380 days.

(21) Appl. No.: 17/335,532

(22) Filed: Jun. 1, 2021

Related U.S. Application Data

(60) Provisional application No. 63/032,853, filed on Jun. 1, 2020.

(51) Int. Cl.
| | |
|---|---|
| *B60R 25/01* | (2013.01) |
| *B60R 7/04* | (2006.01) |
| *B60R 7/06* | (2006.01) |
| *B60R 16/02* | (2006.01) |
| *B60R 16/023* | (2006.01) |
| *B60R 25/21* | (2013.01) |
| *B60R 25/24* | (2013.01) |

(52) U.S. Cl.
CPC .............. *B60R 25/01* (2013.01); *B60R 7/043* (2013.01); *B60R 7/06* (2013.01); *B60R 16/0207* (2013.01); *B60R 16/023* (2013.01); *B60R 16/0239* (2013.01); *B60R 25/21* (2013.01); *B60R 25/24* (2013.01); *B60R 2325/101* (2013.01); *B60R 2325/205* (2013.01)

(58) Field of Classification Search
CPC ........... B60R 25/01; B60R 7/043; B60R 7/06; B60R 16/0207; B60R 16/023; B60R 16/0239; B60R 25/21; B60R 25/24; B60R 2325/101; B60R 2325/205

See application file for complete search history.

(56) References Cited

U.S. PATENT DOCUMENTS

| | | | |
|---|---|---|---|
| 4,992,670 A | 2/1991 | Pastor | |
| 5,977,654 A | 11/1999 | Johnson et al. | |
| 9,073,504 B2 | 7/2015 | Nedorezov et al. | |
| 9,421,945 B1 | 8/2016 | Smathers | |
| 10,359,018 B2 | 7/2019 | Anderson | |
| 2009/0184800 A1* | 7/2009 | Harris | G08C 17/02 340/5.21 |
| 2012/0106076 A1* | 5/2012 | Senatori | G06F 1/1616 361/679.55 |
| 2015/0021113 A1 | 1/2015 | Lefevbre et al. | |

* cited by examiner

*Primary Examiner* — Jung Kim
(74) *Attorney, Agent, or Firm* — Cramer Patent & Design PLLC; Aaron R. Cramer

(57) ABSTRACT

A vehicle ignition interlock device comprises a vehicle ignition locking circuit which relies upon Bluetooth® pairing with a matching cellular phone to enable the ignition. The device is housed in a plastic enclosure having inside a Bluetooth® connection module and a relay that are interconnected to wiring. External wiring then connects the device to vehicle power, ignition interlock, and a valet switch. A valet switch allows the device to be overridden. During initial installation or setup, the device is paired with authorized cellular phones. During use, the owner approaches the vehicle whereupon the device automatically pairs with the phone and enables the ignition. Should the phone not be present, the vehicle will not start.

3 Claims, 4 Drawing Sheets

VEHICLE IGNITION INTERLOCK

RELATED APPLICATIONS

The present invention is a continuation of, was first described in, and claims the benefit of U.S. Provisional Application No. 63/032,853 filed Jun. 1, 2020 the entire disclosures of which are incorporated herein by reference.

FIELD OF THE INVENTION

The presently disclosed subject matter relates generally to a vehicle ignition interlock.

BACKGROUND OF THE INVENTION

Since the automobile was invented, mankind has been figuring out how to secure them from theft and unauthorized use. Many different methods of securing motor vehicles have been invented, but each has had its associated drawbacks. Door and ignition keys can be lost or picked. Anti-theft clubs or locking bars are clumsy, difficult to use as well as time consuming. Additionally, these clubs are easily defeated by bending or cutting the steering wheel.

Kill switches are difficult to install, can malfunction and can also be bypassed by a semi-knowledgeable thief. Various electronic alarms provide good results, but as their use and popularity grows, they are subject to be being ignored. Accordingly, there is a need for a means by which motor vehicles can be secured from possible theft without any of the disadvantages as described above. The development of the vehicle ignition interlock fulfills this need.

SUMMARY OF THE INVENTION

The principles of the present invention provide for a vehicle ignition interlock device has an enclosure having a top, a removable lid which is disposed on the top of the enclosure, a plurality of removable fasteners which couple the removable lid to the enclosure, a wiring harness which has a plurality of individual conductors which are provided to interface the vehicle ignition interlock device to a wiring system of a motor vehicle and, an override switch which allows operation of the motor vehicle when an authorized mobile telephone is not present.

The enclosure may be located at a center console mounting space. The enclosure may be located in an under the dash mounting space or in the engine compartment. The enclosure may be made of plastic. The enclosure may be two square inches with a height of 1½ in. The removable fasteners may couple the removable lid to the enclosure at each corner of the lid. The removable fasteners may be screws. The individual conductors may include 6 individual conductors. The override switch may be located under a dash mounting space, a glove compartment mounting space, under a seat mounting space, under a console mounting space.

The authorized mobile telephone may not present during valet parking. The authorized mobile telephone is not present when the motor vehicle is being serviced, when others are permitted to drive the motor vehicle, when the mobile telephone is not with the user, when the mobile telephone is not functioning. The vehicle ignition interlock device is a disabling device for the vehicle ignition control circuit on a motor vehicle. The vehicle ignition interlock device may become enabled allowing the motor vehicle to start and run when paired with the pre-authorized mobile telephone via a Bluetooth transmitter.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
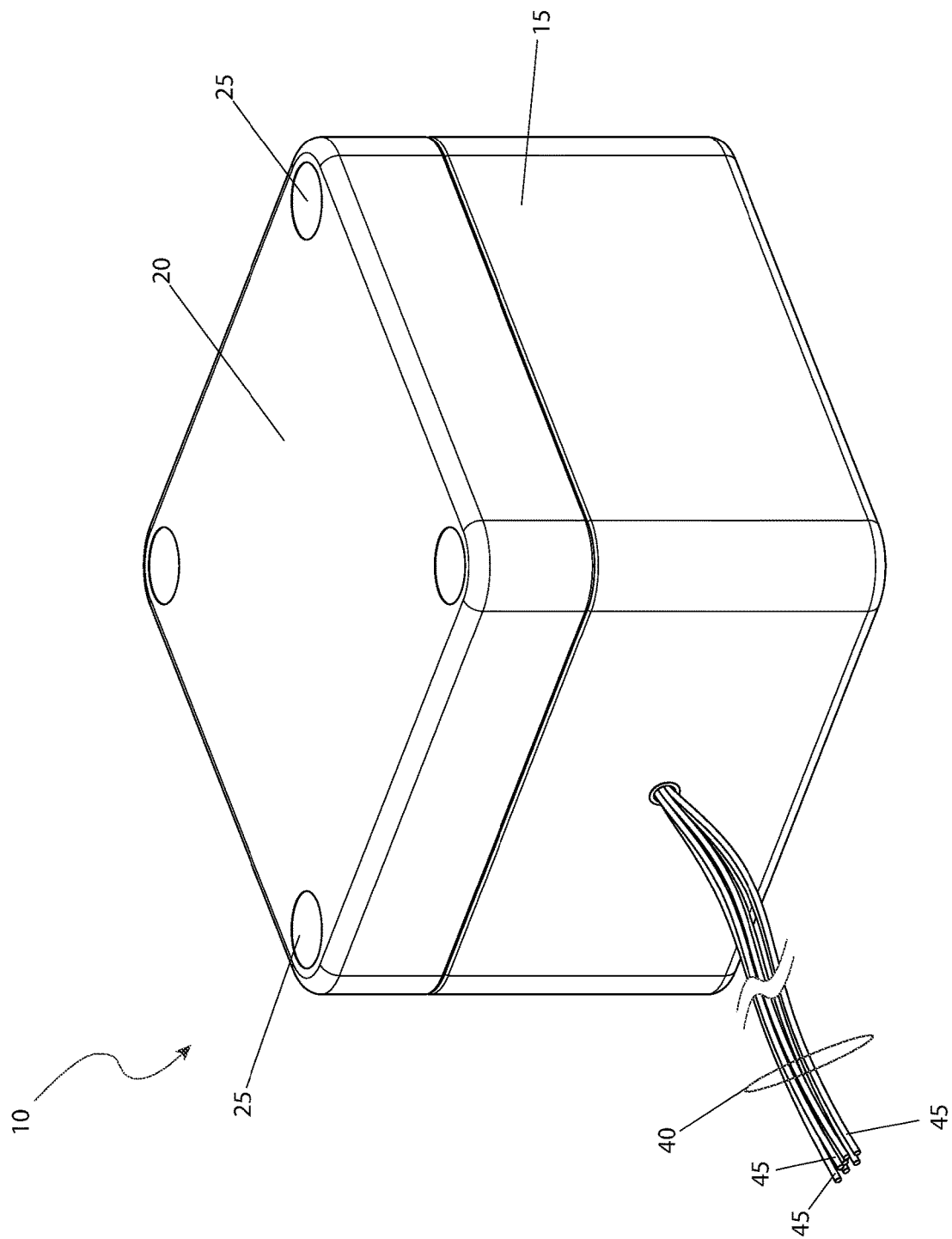
FIG. 1 is a perspective view of the BLUETOOTH® ignition interrupt, according to the preferred embodiment of the present invention.

10 BLUETOOTH® ignition interrupt
15 enclosure
20 removable lid
25 fastener
40 wiring harness
45 individual conductor
50 dashboard
55 inaccessible space
60 override switch
65 under dash mounting space
70 glove compartment mounting space
75 under seat mounting space
80 console mounting space
85 vehicle
90 user
95 mobile telephone
100 BLUETOOTH® RF connection
105 positive battery connection
110 vehicle ground
115 vehicle ignition control
120 BLUETOOTH® module
125 coil
130 relay
135 relay output contact

DESCRIPTION OF THE INVENTION

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of a technology that enables exchange of data between devices within a short amount of distance or BLUETOOTH® ignition interrupt 10, according to the preferred embodiment of the present invention is disclosed. The vehicle ignition interlock device (herein also described as the "device") 10, is a disabling device for the vehicle ignition control circuit 115 on a motor vehicle 85. When paired with a pre-authorized mobile telephone 95 via a BLUETOOTH® transmitter, the vehicle ignition control 115 becomes enabled allowing the motor vehicle 85 to start and run. The electronic components used to operate the device 10 will be described in detail herein below. The components are housed in a plastic enclosure 15 with a removable lid 20 attached by fasteners 25 such as screws. The approximate size of the enclosure 15 is two square inches (2 in.2) with a height of approximately one-and-one-half inches (1½ in.). A wiring harness 40 with six (6) individual conductors 45 are provided to interface the device 10 to a wiring system of the motor vehicle 85. Further description of the connected wiring will be provided herein below.

Figure 2:
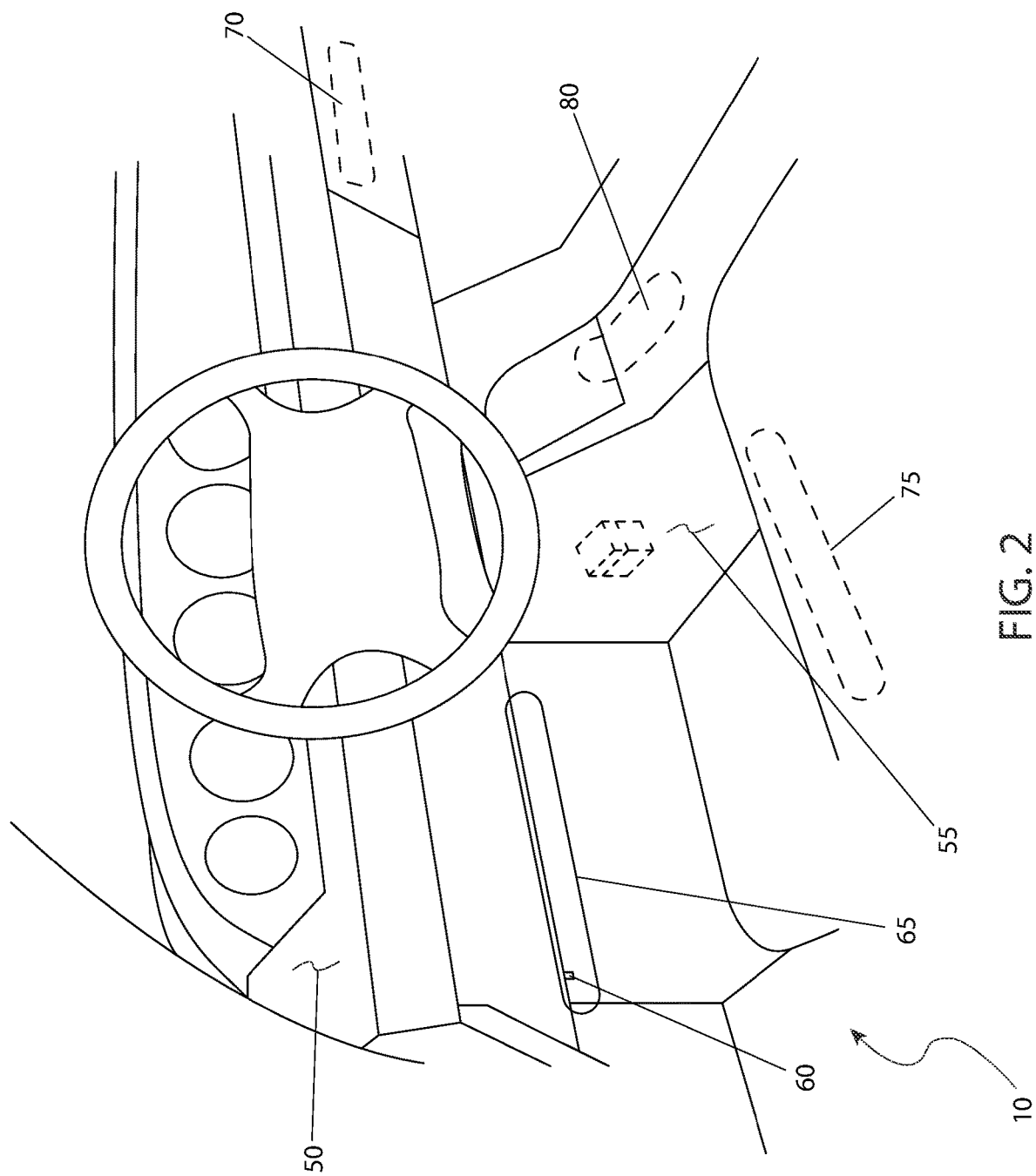
FIG. 2 is a perspective view of the BLUETOOTH® ignition interrupt, shown in an installed state in a dashboard 50, according to the preferred embodiment of the present invention.

Referring next to FIG. 2, a perspective view of the device 10, shown in an installed state in a dashboard 50, according to the preferred embodiment of the present invention is depicted. The enclosure 15 is located in a normally inaccessible space 55 such as a center console mounting space 80 (as shown in FIG. 2), in an under the dash mounting space 65, in the engine compartment, or other similar location. The device 10 utilizes an override switch 60, commonly called a valet switch, to allow operation of the motor vehicle 85 under certain conditions when the authorized mobile telephone 95 is not present. Such situations include, but are not limited to: when valet parking, when the motor vehicle 85 is being serviced, when others are permitted to drive the motor vehicle 85, but the authorized user 90 nor their mobile telephone 95 would be present, at times when the mobile telephone 95 is not with the user 90, or is not functioning. The override switch 60 is located in a not readily accessible space 55 or viewed location such as a under dash mounting space 65, a glove compartment mounting space 70, under a seat mounting space 75 or a console mounting space 80.

Figure 3:
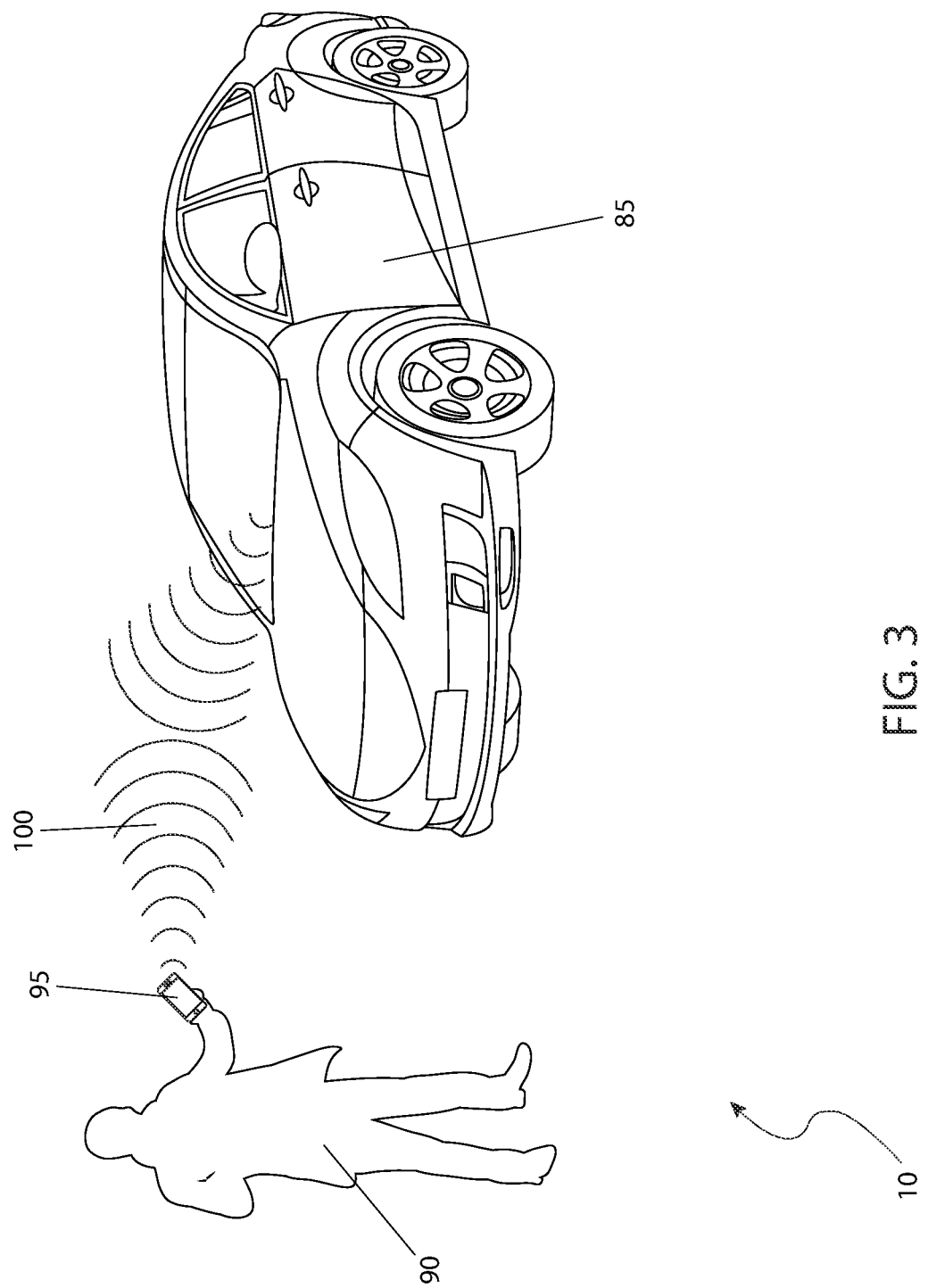
FIG. 3 is a representative view of the BLUETOOTH® ignition interrupt, as shown in a utilized state, according to the preferred embodiment of the present invention.

Referring now to FIG. 3, a representative view of the device 10, as shown in a utilized state, according to the preferred embodiment of the present invention is shown. An equipped motor vehicle 85 is shown in a parked position. As a user 90 with a BLUETOOTH®-enabled mobile telephone 95 approaches the equipped vehicle 85, a BLUETOOTH® RF connection 100 is established. The BLUETOOTH® RF connection 100 processed by the circuitry of the device 10, as will be described below, enables the equipped vehicle 85. It is noted that the device 10 does not start the equipped vehicle 85, but only allows it to be started. The equipped vehicle 85 is started by conventional means such as a key, remote RF key fob, or the like. Should the mobile telephone 95 not be present, the equipped vehicle 85 will simply not start. Not only does this provide an additional level of theft protection, it also alerts the user 90 that he or she may have left their mobile telephone 95 behind before driving off.

Figure 4:
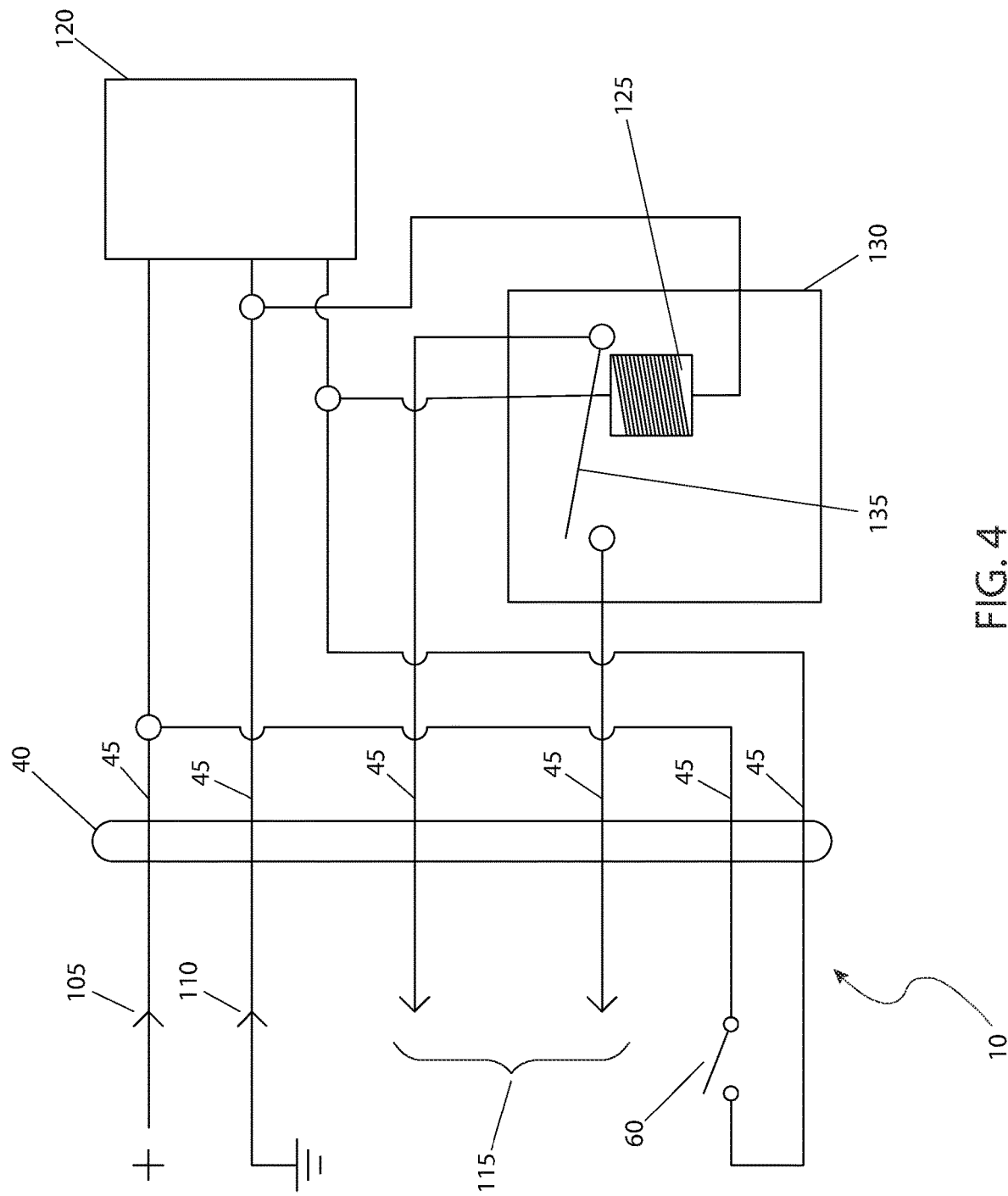
FIG. 4 is an electrical block diagram of the BLUETOOTH® ignition interrupt, according to the preferred embodiment of the present invention.

Referring to FIG. 4, an electrical block diagram of the device 10, according to the preferred embodiment of the present invention is disclosed. Electrical power is provided to the device 10 via a positive battery connection 105 and a vehicle ground 110, two (2) of the six (6) individual conductors 45 (as shown in FIG. 1) with in the wiring harness 40. Two (2) other individual conductors 45 are routed to a vehicle ignition control 115 which provides the actual open or closed circuit to enable the equipped vehicle 85 (as shown in FIG. 3) to start. The last two (2) individual conductors 45 are routed to the override switch 60, herein depicted as a maintained contact single-pole, single-throw (SPST) switch. A BLUETOOTH® module 120 provides a control signal to a coil 125 of a relay 130, while the respective relay output contacts 135 provide the interface to the vehicle ignition control 115. It is noted that the positive battery connection 105 provides continuous power to the device 10 such that it is active all the time and is always awaiting to receive the BLUETOOTH® RF connection 100 as shown in FIG. 3. The pairing switch 30 and the pairing indicator 35 are connected directly to the BLUETOOTH® module 120.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. It is envisioned that the device 10 would be provided as standard or optional equipment on new motor vehicles 85 as well as being made available as an add-on kit for existing motor vehicles 85. In the case of an add-on kit, the user 90 would procure the device 10 from conventional procurement channels such as automotive suppliers, electronic retailers, discount stores, mail order and internet supply houses and the like.

After procurement and prior to utilization, the device 10 would be installed in the following manner: the device 10 would be installed in an inaccessible space 55 such as in a under dash mounting space 65, a glove compartment mounting space 70, an under seat mounting space 75, a console mounting space 80 or similar location, the six (6) individual conductors 45 would be connected to the positive battery connection 105, the vehicle ground 110, the vehicle ignition control 115 and the override switch 60 per the schematic in FIG. 4; the authorized mobile telephone 95 of the user 90 would be paired to the BLUETOOTH® module 120; this pairing process would be repeated for any additional mobile telephones 95; at this point in time the device 10 is ready for use.

During utilization of the device 10, the following procedure would be initiated: the operation of the device 10 is transparent to the user 90 under most situations; as the user 90 approaches the equipped vehicle 85 with a mobile telephone 95 that has been previously paired with the BLUETOOTH® module 120, the equipped vehicle 85 is then enabled to start via other means such as a key, or wireless key fob in conjunction with a start button; if it is the correct user 90, and the equipped vehicle 85 does not start, it may indicate that the user 90 accidentally left his or her mobile telephone 95 behind; in the case of an unauthorized user 90 (potential thief), the equipped vehicle 85 will not start even with the correct key, correct key fob, jimmied ignition or the like; should the equipped vehicle 85 be left in charge of a valet, repair service, temporary users, or the like, the user 90, may activate the override switch 60 for that period of time, while deactivating the override switch 60 when the equipped vehicle 85 is back under direct control of the user 90.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed:

1. A vehicle ignition interlock device, comprising:
   an enclosure having a top, constructed from a heat-resistant and signal-transparent plastic, specifically adapted for housing electronic components in a motor vehicle environment;
   a removable lid disposed on the top of the enclosure, wherein the lid comprises a unique sealing mechanism for enhanced protection against environmental elements commonly found in motor vehicle environments;
   a plurality of removable fasteners, strategically positioned and designed to enhance a structural integrity of the enclosure, coupling the removable lid to the enclosure;
   a wiring harness having a plurality of individual conductors are provided to interface the vehicle ignition interlock device to a wiring system of a motor vehicle, wherein the conductors are shielded and configured for optimized signal integrity; and,
   an override switch, ergonomically designed for ease of access and operation, allowing operation of the motor vehicle when an authorized mobile telephone is not present; and,
   wherein the enclosure is located at a center console mounting space, the enclosure being dimensionally tailored to fit within a plurality of specific contours of standard center console design; or
   wherein the enclosure is located in an under a dash mounting space, designed with a slim profile to fit unobtrusively and securely within this space; or
   wherein the enclosure is located in an engine compartment, featuring enhanced heat and vibration resistance suitable for engine compartment conditions;
   wherein the enclosure is made of a high-impact, heat-resistant plastic material, specifically selected for its durability and resistance to temperature fluctuations common in motor vehicle environments;
   wherein the enclosure measures exactly two square inches with a height of 1-⅞ inches, these dimensions being critical for fitting the device within a confined space of a variety of motor vehicle designs;
   wherein the removable fasteners coupling the removable lid to the enclosure at each corner of the lid are designed for quick release and secure fastening, facilitating easy maintenance while ensuring secure enclosure;
   wherein the removable fasteners are anti-tamper screws, providing additional security against unauthorized access;
   wherein the individual conductors include exactly 6 individual conductors, each conductor dedicated to a specific function within a vehicle ignition interlock system, optimizing the vehicle ignition interlock system's performance and reliability;
   wherein the override switch is strategically located under the dash mounting space, designed for discrete access by authorized personnel only; or
   wherein the override switch is located in a glove compartment mounting space, integrated into a compartment's design for ease of use while remaining inconspicuous; or
   wherein the override switch is located under a seat mounting space, positioned for convenient access without compromising an aesthetic integrity of a vehicle's interior design; or
   wherein the override switch is located under a console mounting space, seamlessly integrated into the console for easy access and operation;
   wherein the authorized mobile telephone is not present during valet parking, the device includes a specific valet mode that temporarily disables a Bluetooth®-enabled security feature while maintaining a secondary level of security;
   wherein the authorized mobile telephone is not present when the motor vehicle is being serviced, the device includes a service mode allowing temporary deactivation of the Bluetooth®-enabled security feature by authorized service personnel;
   wherein the authorized mobile telephone is not present when others are permitted to drive the motor vehicle, the device enables a guest mode allowing limited access to vehicle ignition features;
   wherein the authorized mobile telephone is not present when the mobile telephone is not with a user, the device provides a notification mechanism alerting the user of the absence of a paired mobile phone; and,
   wherein the authorized mobile telephone is not present when the mobile telephone is not functioning, the device enables an emergency access feature allowing vehicle operation under predefined emergency conditions.

2. The vehicle ignition interlock device of claim 1, wherein the vehicle ignition interlock device is a disabling device for a vehicle ignition control circuit on the motor vehicle, featuring a multi-layer security protocol that includes both Bluetooth® connectivity and a secondary authentication mechanism.

3. The vehicle ignition interlock device of claim 2, wherein the vehicle ignition interlock device becomes enabled allowing the motor vehicle to start and run when paired with a pre-authorized mobile telephone via a Bluetooth® transmitter, the Bluetooth® transmitter being optimized for low energy consumption and high-reliability connection within the vehicle environment.

* * * * *